(12) United States Patent
Hurtevent et al.

(10) Patent No.: US 10,329,879 B2
(45) Date of Patent: Jun. 25, 2019

(54) METHOD FOR ADJUSTING THE LEVEL OF INHIBITORS IN AN OIL OR GAS WELL

(71) Applicants: TOTAL SA, Courbevoie (FR); UNIVERSITE LYON 1, Villeurbanne (FR); CENTRE NATIONAL DE LA RECHERCHE SCIENTIFIQUE—CNRS, Paris (FR)

(72) Inventors: Christian Hurtevent, Pau (FR); Salima Baraka-Lokmane, Pau (FR); John-Richard Ordonez-Varela, Lons (FR); Olivier Tillement, Fontaines Saint-Martin (FR); Thomas Brichart, Vannes (FR); Matteo Martini, Lyons (FR)

(73) Assignees: TOTAL SA, Courbevoie (FR); UNIVERSITE LYON 1, Villeurbanne (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 229 days.

(21) Appl. No.: 15/105,328

(22) PCT Filed: Dec. 19, 2014

(86) PCT No.: PCT/FR2014/053441
§ 371 (c)(1),
(2) Date: Jun. 16, 2016

(87) PCT Pub. No.: WO2015/092310
PCT Pub. Date: Jun. 25, 2015

(65) Prior Publication Data
US 2017/0002629 A1    Jan. 5, 2017

(30) Foreign Application Priority Data
Dec. 20, 2013   (FR) ...................... 13 63287

(51) Int. Cl.
*E21B 37/06* (2006.01)
*C09K 8/528* (2006.01)
(Continued)

(52) U.S. Cl.
CPC .............. *E21B 37/06* (2013.01); *C09K 8/528* (2013.01); *C09K 8/54* (2013.01); *E21B 41/02* (2013.01);
(Continued)

(58) Field of Classification Search
CPC ............ E21B 37/06; C09K 8/528; C09K 8/54
(Continued)

(56) References Cited

U.S. PATENT DOCUMENTS

| 2009/0087912 A1* | 4/2009 | Ramos | C09K 8/032 436/27 |
| 2012/0032093 A1* | 2/2012 | Moore | C02F 5/12 250/459.1 |
| 2013/0236983 A1 | 9/2013 | Lehmann et al. | |

FOREIGN PATENT DOCUMENTS

WO     2010/140033 A2    12/2010

OTHER PUBLICATIONS

Jun. 21, 2016 International Preliminary Report on Patentability issued in International Patent Application No. PCT/FR2014/053441.
(Continued)

*Primary Examiner* — William D Hutton, Jr.
*Assistant Examiner* — Ashish K Varma
(74) *Attorney, Agent, or Firm* — Oliff PLC

(57) ABSTRACT

A method for adjusting, to a pre-determined value, the level of a mineral deposition or corrosion inhibitor injected into a gas or oil well. Using of the time-resolved fluorescence
(Continued)

method for detecting and quantifying a mineral deposition or corrosion inhibitor in a fluid from an oil or gas production well.

6 Claims, 5 Drawing Sheets

(51) Int. Cl.
    *C09K 8/54*         (2006.01)
    *E21B 47/10*       (2012.01)
    *E21B 41/02*       (2006.01)
    *E21B 47/00*       (2012.01)

(52) U.S. Cl.
    CPC ............ *E21B 47/00* (2013.01); *E21B 47/102* (2013.01); *C09K 2208/32* (2013.01)

(58) Field of Classification Search
    USPC .................................................. 166/250.01
    See application file for complete search history.

(56) References Cited

OTHER PUBLICATIONS

Mar. 23, 2015 International Search Report issued in International Patent Application No. PCT/FR2014/053441.
Neil Poynton et al.; "Development of a New Tagged Polymeric Scale Inhibitor with Accurate Low-level Residual Inhibitor Detection, for Squeeze Applications;" SPE International Conference on Oilfield Scale; May 30, 2012; XP055135347.

\* cited by examiner

METHOD FOR ADJUSTING THE LEVEL OF INHIBITORS IN AN OIL OR GAS WELL

TECHNICAL FIELD

The invention relates to a method for adjusting, to a pre-determined value, the level of a mineral deposition or corrosion inhibitor injected into a gas or oil well. The invention also relates to the use of the time-resolved fluorescence method for detecting and quantifying a mineral deposition or corrosion inhibitor in a fluid from an oil or gas production well.

BACKGROUND OF THE INVENTION

During the operation of gas or oil fields, the recovery of the oil can be improved by injecting water into the deposit, via an injection well, in such a way as to push the oil from the deposit out of the ground, via at least one other well called the production well. The interaction of the injected water with the reservoir containing the gas, the oil and underground water can result in the formation of chemical species able to cause operating defects in the installations. More particularly, deposits of barium sulphate, calcium carbonate or zinc and lead sulphides, for example, are in particular able to form in operating conditions with high pressure and high temperature or during the putting into contact of the injected brine in order to extract the oil or the gas with the hydrogen sulphide or the ions contained in the reservoir. The production of reservoir or aquifer water simultaneously with the oil or the gas can result in the same phenomena. These mineral deposits are able to obstruct the flow channels in the formation, to pollute the pipes and the surface equipment and to block the pumping systems. More generally, mineral deposits or corrosion phenomena can appear in different operating conditions.

In order to prevent or slow these phenomena, additives are injected into the underground formation or into the gas or oil wells. An example of such additives is comprised of mineral deposition inhibitors and of corrosion inhibitors. The injection of a fluid containing an inhibitor capable of preventing the formation of problematic crystals, preventing their growth or dispersing them makes it possible as such to counter the aforementioned disadvantages and to avoid or delay the disassembly of the installations in order to clean them.

The dosage of these inhibitors constitutes however an essential aspect of the production of hydrocarbons, in order to ensure that they are present in sufficient quantities to fulfil their function and, in case of need, to inject in a timely manner an additional quantity of inhibitor, adjusted in order to take into account the economic constraints of the method and its environmental impact.

The methods currently used to dose these inhibitors are often not very accurate and/or long and require equipment that is often insufficiently adapted to the operating conditions. One of the examples of these methods is the dosage of corrosion inhibitors via methylorange. Although this technique has great flexibility, it is cruelly lacking in reliability and has a high degree of relative uncertainty on the results.

For the dosing of molecules that inhibit mineral deposits, a precise chemical analysis is required for a certain number of specific elements of one of the molecules used (measurement of the nitrogen or phosphorus content for example, method referred to as Hyamine for polymers). These measurements can be taken either by mass spectrometry and/or by separation and concentration using analytical devices such as high performance liquid chromatography (HPLC). These techniques are both complex and difficult to set up.

The developing of a reliable and fast method of detection is further hindered by the fact that these inhibitors are generally so effective that they are present in the injected fluid only as a few ppm, and by the presence in the fluid constituted of operating water with a diversity of compounds such as salts and organic residue. Because of the presence of these compounds, the complex fluid produced has in particular an intrinsic fluorescence which prevents the detection of inhibitors, possibly tagged by fluorescent probe, using conventional fluorescence techniques. Finally, the production sites are generally located in remote areas, far from local analysis laboratories, which forms an additional constraint.

It would therefore be desirable to be able to dose these inhibitors directly on the site, in the production water, using a method that is simple, reliable and accurate, that can be used on a diversity of mineral deposition and corrosion inhibitors and that can be implemented using devices that are not large in order to be moved easily.

The inventors have shown that these needs could be satisfied by combining these inhibitors with a lanthanide ion and by using the time-resolved fluorescence method. This method makes it possible indeed to overcome the natural fluorescence of the operating water, which has very short emission times, and to collect only the light emitted after a delay of a few microseconds to one millisecond, more preferably from 100 microseconds to one millisecond, resulting from the fluorescence of the inhibitors tagged as such. The dosage of the inhibitors can then be carried out via quantification of the phosphorescence signal emitted, with precision to less than 10 ppm, and even less than 1 ppm.

This method furthermore has the advantage of specifically identifying the type of inhibitor (of mineral deposition or corrosion), even when it is present in a complex fluid formed by the production water in the oil medium, according to its optical signature, by using simultaneously the excitation and emission spectra and the lifetimes of the signals emitted.

SUMMARY OF THE INVENTION

The invention relates to a method for adjusting, to a pre-determined value, the level of a mineral deposition or corrosion inhibitor injected into a gas or oil well, comprising the following successive steps:
 the tagging of the inhibitor using a lanthanide,
 the detecting and the quantifying of the tagged inhibitor, via time-resolved fluorescence, in the fluid extracted from the production well, and
 if necessary, the injecting into the well of an additional quantity of inhibitor making it possible to reach said predetermined value.

The invention also relates to the use of the time-resolved fluorescence method for detecting and quantifying a mineral deposition or corrosion inhibitor in a fluid from an oil or gas production well.

DETAILED DESCRIPTION OF EMBODIMENTS

The method according to the invention substantially comprises the detection and the quantification, via time-resolved fluorescence, of a mineral deposition or corrosion inhibitor, tagged by a lanthanide, which is present in the fluid extracted from an oil or gas production well.

"Mineral deposition inhibitor" means a compound that can prevent or slow the formation (i.e. the nucleation and/or the growth) of crystals of mineral salts chosen in particular from: calcium carbonate, calcium sulphate, barium sulphate, strontium sulphate, zinc, lead and iron sulphides and mixtures thereof. The mineral deposition inhibitors that can be used according to the invention can in particular be chosen from:
- polyphosphates, such as sodium tripolyphosphate (STPP), sodium hexametaphosphate (SHMP),
- organophosphonates, such as amino tri(methylene phosphonic) acid or AMP, 1-hydroxyethylidene-1,1-diphosphonic acid or HEDP, ethylenediamine tetra(methylene phosphonic) acid or EDTMP, hexamethylenediamine tetra(methylene phosphonic) acid or HMTMP, diethylenetriamine penta(methylene phosphonic) acid or DETMP, hydroxyethylamino-di(methylenephosphonic) acid (HEMPA),
- carboxylic polyacids such as 2-phosphonobutane 1,2,4-tricarboxylic acid or PBTC, poly(acrylic acid) or PAA, poly(methacrylic acid) or PMAA, poly(maleic acid) or PMA,
- polymers with a sulphonic acid function, such as styrene sulphonic acid and (poly)carboxylic acid copolymers, in particular styrene sulphonic acid and maleic acid copolymers, styrene sulphonic acid and (poly)amidoamine copolymers, vinylsulphonate homo- and copolymers, in particular vinylsulphonate, styrene and maleic anhydride copolymers, alkyldiphenylether sulphonates and acrylamidomethylpropane sulfonic acid (AMPS), maleic acid and acrylic acid copolymers,
- optionally sulphonated polyphosphinocarboxylic acid (PPCA),
- polyethyleneimine (PEI),
- silicone polymers, in particular polydimethylsiloxanes, functionalised by amine groups, and
- copolymers made from quaternary ammonium, such as acrylamide, quaternary ammonium and possibly acrylate copolymers and acrylamide, diallyldimethylammonium salt and possibly acrylate copolymers.

"Corrosion inhibitor" means a compound that can reduce the speed of corrosion of a material, typically a metal or a metal alloy, due to the action on this material of an oxidant such as oxygen or the $H^+$ ion. Examples of corrosion inhibitors are in particular mono-, di- and triamines such as cyclohexylamine, hexylamine, morpholine or octadecylamine, as well as amino-alcohols such as diethylaminoethanol, quaternary ammoniums and betaines.

Lanthanides used as tags according to the invention can be chosen from elements with atomic numbers 57 (lanthanum) to 71 (lutetium), such as Pr, Nd, Sm, Eu, Tb, Dy, Ho, Er, Tm and Yb, as well as mixtures and/or alloys thereof. The preferred lanthanides for a use according to the invention are europium (Eu) and terbium (Tb).

According to a first embodiment of the invention, more particularly suited for inhibitors of the polymeric type, the tagging of the inhibitor by the lanthanide can be carried out in a fluid injected into the well. The optical signature of the tagged inhibitor is recorded, corresponding to its characteristics of emission, of excitation and of lifetime, which is then compared with the data collected from the extracted fluid. It is as such possible to identify and to quantify the tagged inhibitor within a fluid extracted from the production well.

In this embodiment of the invention, the tagging of the inhibitor using lanthanide can be carried out in different ways.

In a first alternative adapted in particular to inhibitors of the polymeric type, a molecule complexing the lanthanide can be grafted onto the skeleton of the inhibitor. "Complexing molecule" means any molecule capable of forming with the lanthanide a complex comprising at least two coordination bonds. A complexing molecule is preferably chosen that has a coordination number of at least 6, for example of at least 8, and a dissociation constant of the complex with the lanthanide greater than 10 and preferably greater than 15. These complexing molecules are advantageously polydendate chelating molecules chosen in particular from polyamines and carboxylic polyacids, such as diethylenetriamine pentaacetic acid (DTPA), ethylenediamino tetraacetic acid (EDTA) and DOTA-GA (nitrogenous macrocycle carrying 3 carboxyl functions and a glutaric anhydride function), DOTAM (nitrogenous macrocycle carrying 4 amine functions) and DO3AM (nitrogenous macrocycle carrying 3 amine functions and one aminoethyl ethanamide function. It will be ensured, in this alternative of the invention, that the size of the chelating molecule and the number of chelating molecules per molecule of inhibitor do not disturb the operation of the latter.

In a second alternative, adapted more particularly to inhibitors of the chelate type which have a complexation constant with the lanthanide ions that is greater than 10, the tagging of the inhibitor can be carried out by complexation of the lanthanide using the inhibitor. In this alternative, the tagged molecules of inhibitor can represent from $\frac{1}{100}$ to $\frac{1}{1000}$ of the total molecules of inhibitor injected into the well.

According to a second embodiment of the invention, the inhibitor can be tagged in the fluid extracted from the production well, after the step of extraction. In this embodiment, lanthanide ions are introduced into the extracted fluid and form complexes with the inhibitors present. Comparing the emission, excitation and/or lifetime characteristics of the free lanthanide ions and of complexed lanthanide ions makes it possible to identify and to quantify the inhibitors present in the extracted fluid.

According to the invention, the inhibitor is detected, and its level is quantified, by using a time-resolved fluorescence method which is in particular described in the article "Ultrasensitive bioanalytical assays using time resolved fluorescence detection", Pharmacol. Ther. Vol. 66(2), pp. 207-35, 1995. The latter is based on the application of a delay, referred to as integration delay, between the excitation of the sample to be analysed and the measurement of the signal emitted, in such a way as to overcome parasite fluorescences with a short lifetime. This method can be implemented at ambient temperature, in particular using a device of the Cary Eclipse type from Agilent, as indicated in the Examples. The excitation wavelength can be between 200 and 600 nm and the emission wavelength can be between 300 and 800 nm. The integration delay can be between 0.001 and 10 ms, preferably between 0.01 and 5 ms, more preferentially between 0.1 and 3 ms. In certain cases, the longer this delay is, the better the signal-to-noise ratio is, which improves the reliability of the measurement. The collection duration for the photons can range from 5 to 10 ms, for example. This method can be applied in different ways. It is as such possible to compare the emission intensity of the sample tested with those obtained at different concentrations of inhibitor, in order to deduce from it the concentration of the inhibitor in the sample. Alternatively, it is possible to detect several inhibitors in the sample tested by measuring the speed of decay of the signal emitted by the sample, or half-life, and by comparing the values obtained with those known for the various inhibitors.

FIGURES

Figure 7:
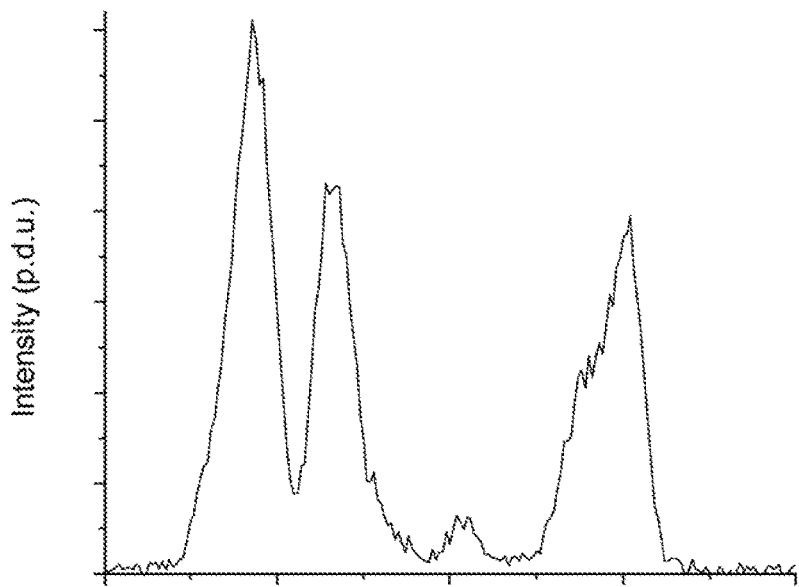
Figure 8:
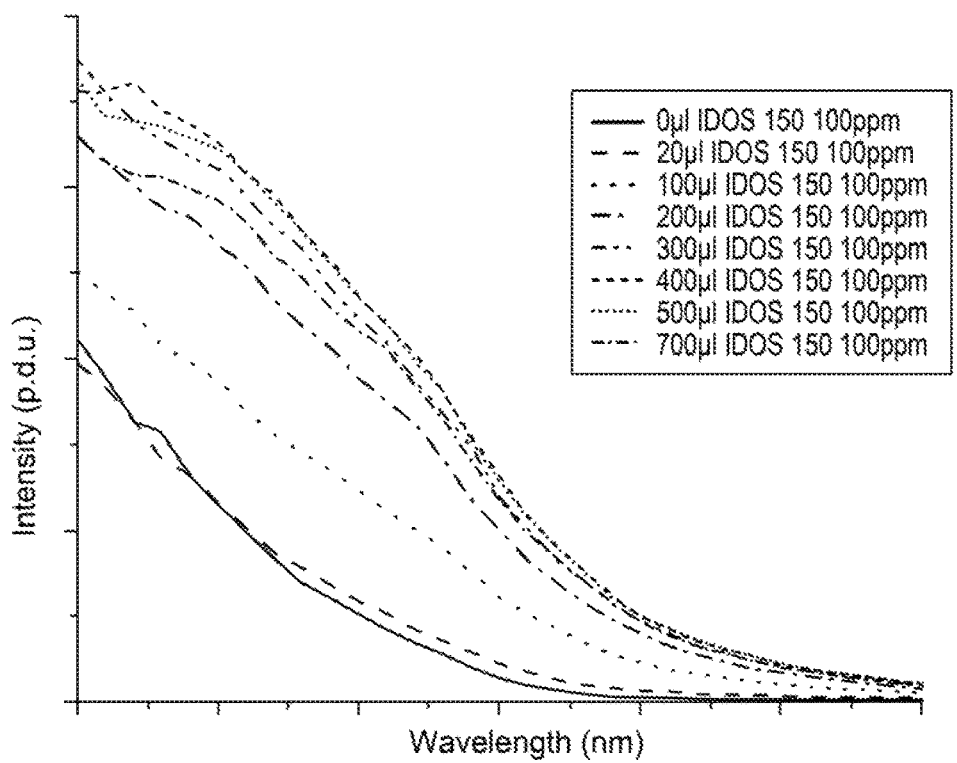
Figure 9:
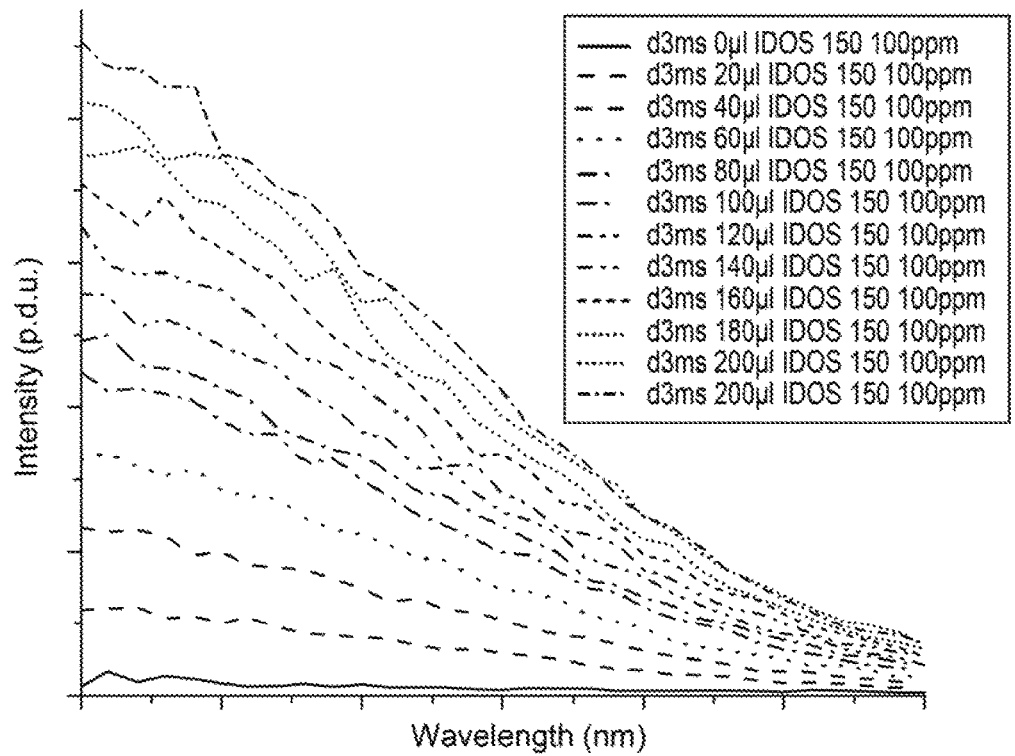

FIG. 7 shows the emission spectrum of an inhibitor of the grafted polyethyleneimine DOTA-GA(Eu) type FIGS. 8 and 9 show respectively the excitation spectra of sulphonated Tb-PPCA mixtures with an integration delay of 0.1 ms and 3 ms This invention shall be better understood in light of the following non-limiting examples, which are provided solely for the purposes of information and do not have the purpose of limiting the scope of this invention which is defined by the annexed claims.

EXAMPLES

Example 1

Detection of the DETMP Tagged by Complexation

Four solutions of variable concentrations between 0 and 5 ppm are prepared by adding volumes from 0 to 1000 µl of solution of DETMP (inhibitor of the formation of calcium carbonate and sulphate) at 10 ppm in 2 mL of production water from the Lagrave well, France. A sufficient quantity of $TbCl_3$ is then added in order to obtain a concentration equal to 0.5 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $\Delta_{pulse}$=2 µs, PM detector at 800V). The delay is set to 0.1 ms and the duration of the photon collection to 5 ms. The frequency of the lamp is set to 100 Hz.

Excitation spectra of the various samples are carried out between 220 and 400 nm with $\lambda_{em}$=545 nm. The spectra obtained are shown in FIG. 1.

Figure 1:
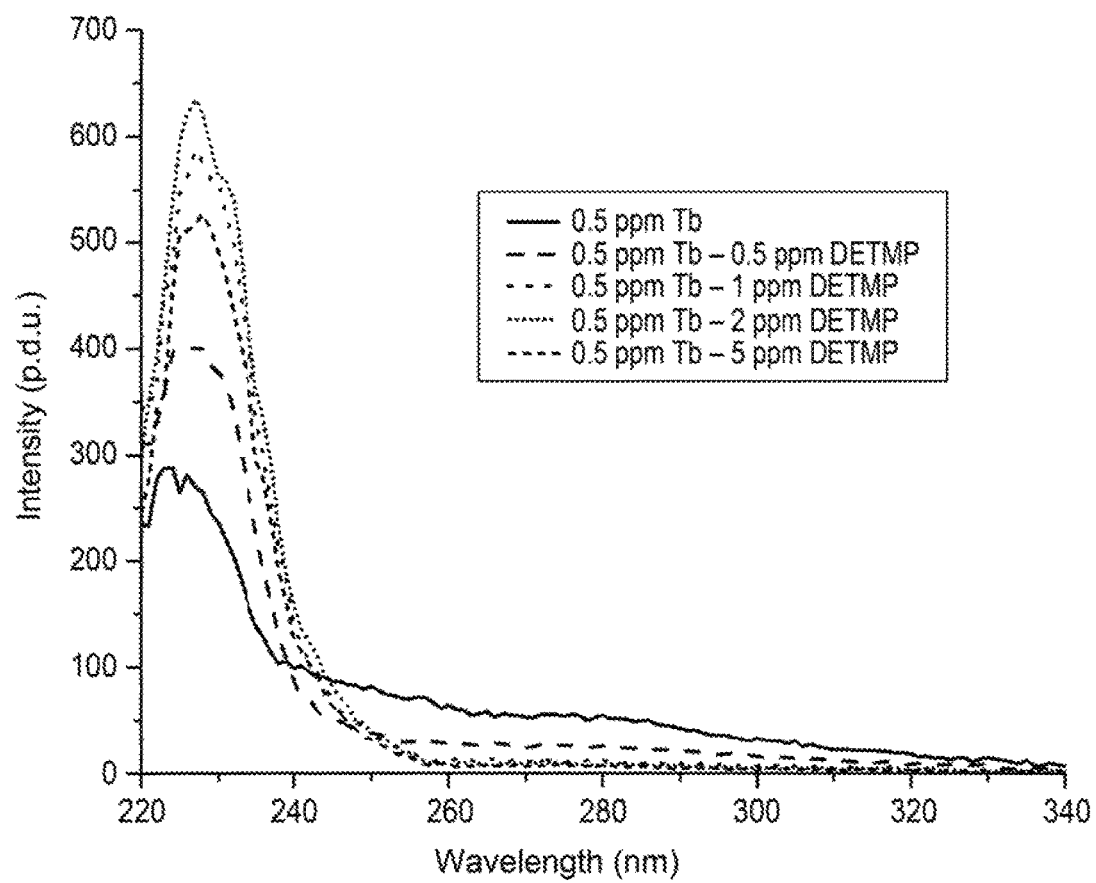
FIG. 1 shows the excitation spectrum of Tb-DETMP mixtures

FIG. 1 shows a modification in the intensities and in the shape of the peaks on the excitation spectra showing a complexation of the terbium ions by the DETMP. This example shows that it is as such possible to detect the DETMP between 0.5 and 5 ppm.

Example 2

Detection of a Polymeric Inhibitor Tagged by Complexation

Eleven solutions of variable concentrations between 0 and 10 ppm are prepared by adding volumes from 0 to 1000 µl of sulphonated solution of PPCA (IDOS 150 supplied by REP, which is an inhibitor of barium and strontium deposits) at 100 ppm in 2 mL of water. A sufficient quantity of $TbCl_3$ is then added in order to obtain a concentration equal to 10 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $\Delta_{pulse}$=2 µs, PM detector at 800V). The delay is set to 3 ms and the duration of the photon collection to 5 ms. The frequency of the lamp is set to 100 Hz.

Excitation spectra of the various samples are carried out between 220 and 250 nm with $\lambda_{em}$=545 nm. The intensities of the peaks at 225 nm are shown in Table 1 hereinbelow.

TABLE 1

| Concentration in sulphonated PPCA (in ppm) | Intensity at 225 nm (emission at 545 nm) Delay: 3 ms (in p.d.u.) |
|---|---|
| 0.0 | 1.7 |
| 1.0 | 10.0 |
| 2.0 | 20.0 |
| 2.9 | 28.5 |
| 3.8 | 38.0 |
| 4.8 | 42.5 |
| 5.7 | 48.4 |
| 6.5 | 56.3 |
| 7.4 | 62.1 |
| 8.3 | 68.1 |
| 9.1 | 74.4 |

Figure 2:
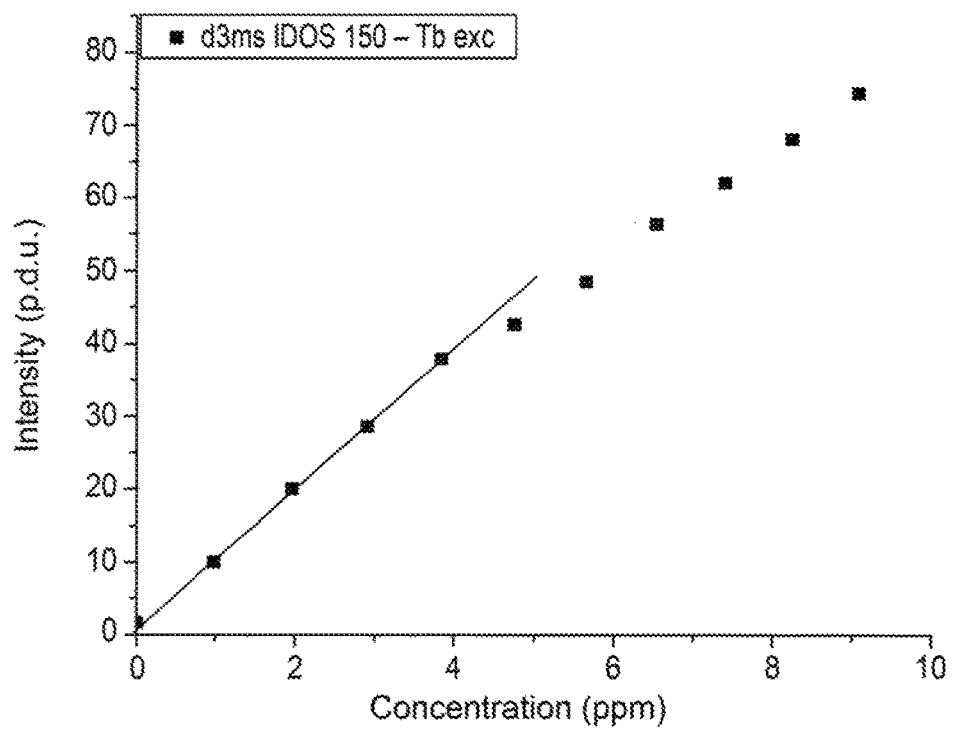
FIG. 2 shows the curve of the intensity of the fluorescence according to the concentration in sulphonated PPCA

All of the resulting points are shown in FIG. 2. This Figure shows that the emission intensity changes clearly with the quantity of inhibitor. It is as such possible to easily determine the quantity of sulphonated PPCA to a concentration less than 10 ppm and with precision of less than 1 ppm.

Example 3

Detection of a Styrene Sulphonic Acid/Maleic Acid Copolymer Tagged by Complexation Eleven solutions of variable concentrations between 0 and 5 ppm are prepared by adding volumes from 0 to 1000 µl of solution of styrene sulphonic acid/maleic acid copolymer, or FL1 (inhibitor of zinc and lead sulphide deposits) at 10 ppm in 2 mL of production water from the Lagrave well, France. A sufficient quantity of $TbCl_3$ is then added in order to obtain a concentration equal to 10 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $\Delta_{pulse}$=2 µs, PM detector at 800V). The delay is set to 3 ms and the duration of the photon collection to 5 ms. The frequency of the lamp is set to 100 Hz.

Excitation spectra of the various samples are carried out between 220 and 250 nm with $\lambda_{em}$=545 nm. The intensities of the peaks at 225 nm are shown in Table 2 hereinbelow.

TABLE 2

| Concentration in Fl1 (in ppm) | Intensity at 225 nm (emission at 545 nm) Delay: 3 ms (in p.d.u.) |
|---|---|
| 0.00 | 1.8 |
| 0.10 | 7.0 |
| 0.20 | 11.2 |
| 0.29 | 13.2 |
| 0.38 | 17.8 |
| 0.48 | 19.0 |
| 0.91 | 25.4 |
| 1.30 | 30.8 |
| 1.67 | 30.7 |
| 2.00 | 30.3 |
| 3.33 | 27.1 |

Figure 3:
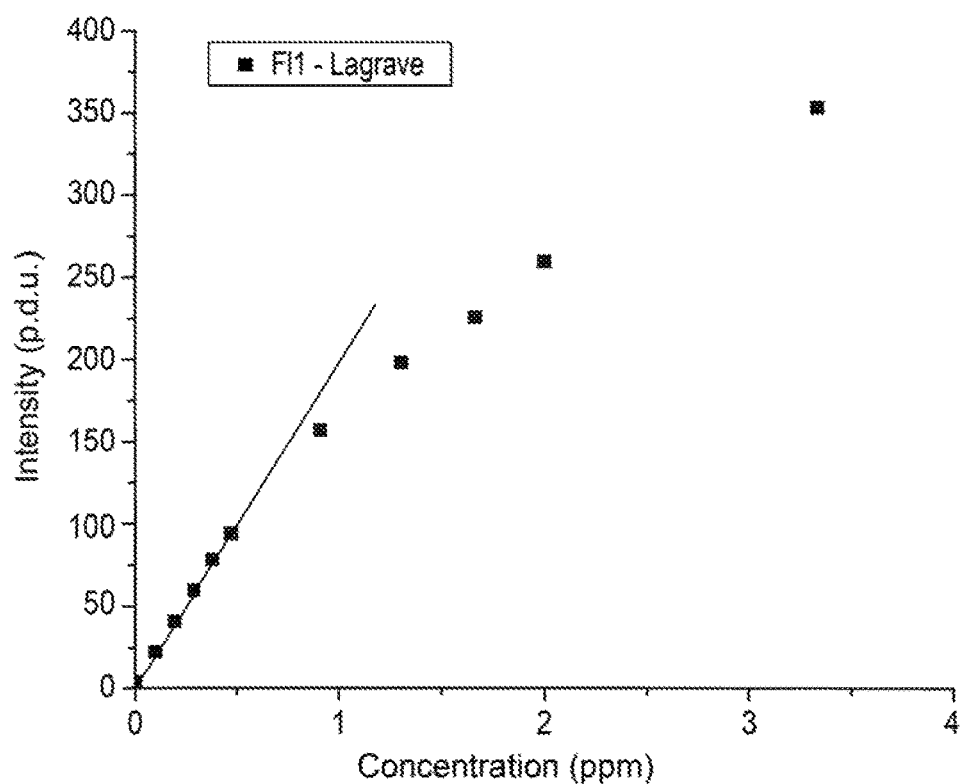
FIG. 3 shows the curve of the intensity of the fluorescence according to the concentration in inhibitor Fl1

All of the resulting points are shown in FIG. 3. As can be seen in this Figure, the emission intensity changes clearly with the quantity of inhibitor. It is as such possible to easily determine the quantity of Flt to a concentration less than 1 ppm and with precision of less than 0.1 ppm.

Example 4

Detection of Deposition Inhibitors Tagged by Complexation in the Water of Qatar

Four solutions are prepared containing different inhibitors of deposits by adding volumes from 0 to 20 µl of a solution of DETMP or of sulphonated PPCA at 100 ppm to 2 mL of production water from a well located in Qatar. A sufficient quantity of $TbCl_3$ is then added in order to obtain a concentration equal to 5 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $Δ_{pulse}$=2 µs, PM detector at 800V). The delay is set to 3 ms and the duration of the photon collection to 5 ms. The frequency of the lamp is set to 100 Hz.

Figure 4:
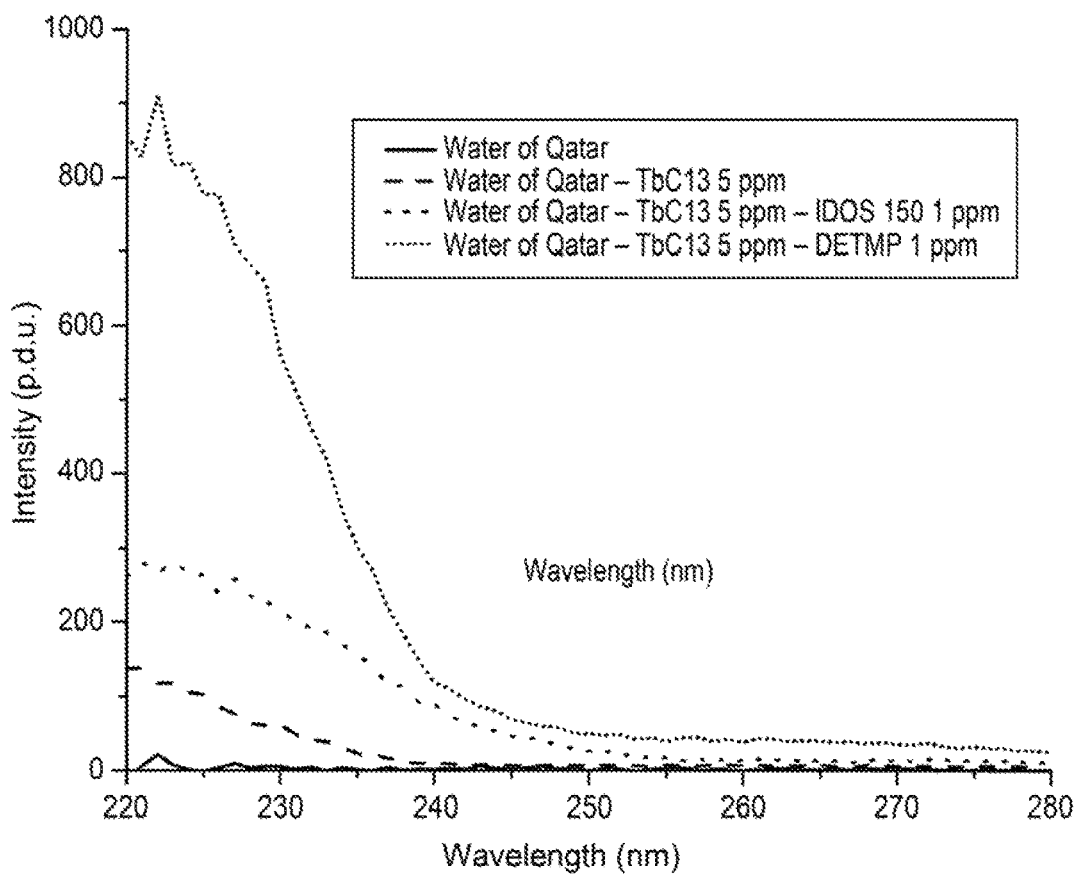
FIG. 4 shows the excitation spectra of Tb-IDOS-DETMP mixtures in the production water of Qatar

Excitation spectra of the various samples are carried out between 220 and 280 nm with $λ_{em}$=545 nm. The spectra obtained are shown in FIG. 4. As can be seen in this Figure, the intensity of the fluorescence is clearly modified by the adding of sulphonated PPCA or DETMP. It is therefore possible to determine concentrations of sulphonated PPCA and of DETMP in the production water of Qatar at concentrations less than 1 ppm.

Example 5

Detection of Corrosion Inhibitors Tagged by Complexation

Three solutions containing different corrosion inhibitors are prepared by adding volumes from 0 to 20 µL of solution of cyclohexylamine or morpholine at 100 ppm in 2 mL of water. A sufficient quantity of $TbCl_3$ is then added in order to obtain a concentration equal to 5 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $Δ_{pulse}$=2 µs, PM detector at 800V). The delay is set to 0.015 ms, the collection time to 10 ms, the pitch to 0.01 ms. The frequency of the lamp is set to 100 Hz.

Lifetime spectra are carried out with $λ_{exc}$=270 nm and $k_{em}$=545 nm. The curves obtained are modelled by simple or double decaying exponential functions. The results are gathered together in Table 3 hereinbelow.

TABLE 3

| Solution | $t_1$ | $t_2$ |
| --- | --- | --- |
| 10 ppm Tb | 0.185 | — |
| 10 ppm Tb + 1 ppm cyclohexylamine | 0.112 | 0.286 |
| 10 ppm Tb + 1 ppm morpholine | 0.047 | 0.253 |

Here, the appearance of a second speed of decay during the adding of a corrosion inhibitor is observed. The latter allows them to be discriminated with regards to free terbium ions and therefore the detection thereof.

Example 6

Detection of a Mixture of Deposition or Corrosion Inhibitors Tagged by Complexation Four solutions are prepared containing different deposition or corrosion inhibitors by adding volumes from 0 to 20 µL of solution of cyclohexylamine, morpholine (corrosion inhibitors) or sulphonated PPCA (deposit inhibitor) at 100 ppm in 2 mL of water. A sufficient quantity of $TbCl_3$ is then added in order to obtain a concentration equal to 5 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $Δ_{pulse}$=2 µs, PM detector at 800V). The delay is set to 0.015 ms, the collection time to 10 ms, the pitch to 0.01 ms. The frequency of the lamp is set to 100 Hz.

Figure 5:
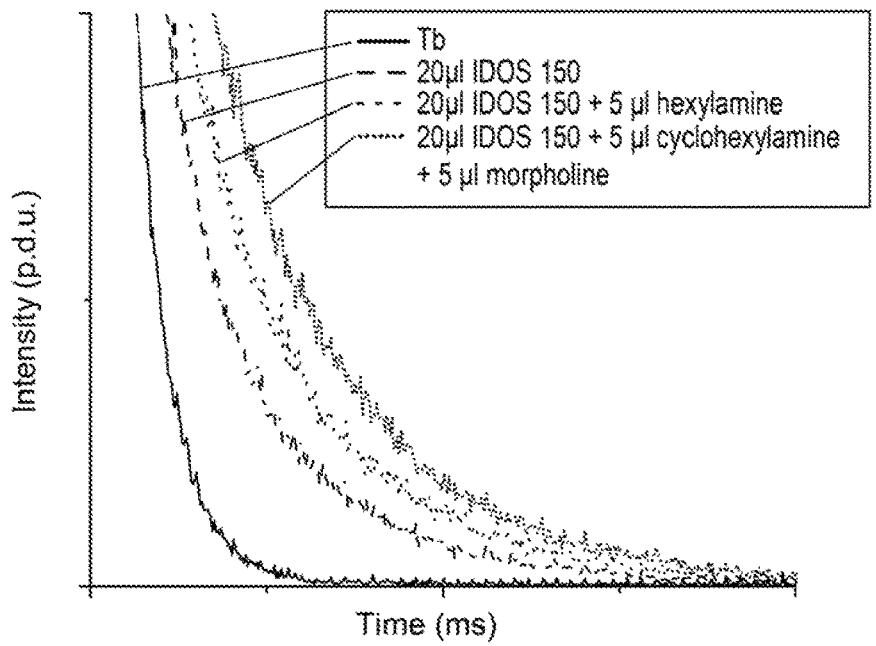
FIG. 5 shows the decay curves of sulphonated Tb-PPCA-cyclohexylamine-morpholine mixtures

Lifetime spectra are carried out with $λ_{exc}$=270 nm and $λ_{em}$=545 nm. All of the curves obtained are grouped together in FIG. 5. The curves obtained are modelled by simple or double decaying exponential functions, and the results are grouped together in Table 4 hereinbelow.

TABLE 4

| Product | t1 | t2 |
| --- | --- | --- |
| TbCl3 | 0.185 | — |
| TbCl3 + sulphonated PPCA | 0.185 | 0.720 |
| TbCl3 + sulphonated PPCA + hexylamine | 0.185 | 0.747 |
| TbCl3 + sulphonated PPCA + hexylamine + morpholine | 0.185 | 0.776 |

It is observed here that the long component of the decay for the three mixtures of deposition and corrosion inhibitors is different for each one of the mixtures. This makes it possible to determine the lifetime of each product independently and to separate the contribution in intensity of each one of the fluorescences. It is as such possible to know the concentration of a mixture of inhibitors with good accuracy.

Example 7

Detection of a Styrene Sulphonic Acid/Maleic Acid Copolymer Tagged by Grafting-Complexation In a 10 mL bottle, 5 mL of styrene sulphonic acid/maleic acid copolymer (inhibitor of zinc and lead sulphide deposits) is placed, or Fl1, at 30% by weight. The pH is then adjusted to about 6.3 by adding about 50 µl of 6M HCl. In a second 15 mL bottle, 5 mL of diethyleneglycol (DEG) are placed as well as 40 mg of DOTA-GA anhydride (Chematech Company, France) and 18 µL of diethylenetriamine (DETA). The pH of this second solution is adjusted to about 7.2 by adding about 30 µl of 6M HCl. The two solutions are placed under magnetic stirring for 24 h.

After 24 h, in the first bottle containing the Fl1, 101 mg of 1-ethyl-3-(3-dimethylaminopropyl) carbodiimide (EDC) and 170 mg of N-hydroxysuccinimide (NHS) are added. The pH is then again adjusted to 6.3. After 15 minutes, the content of the two bottles is mixed. The pH is adjusted to 7.2. After 24 h, 20 mg of $TbCl_3.6H_2O$ (Nano-H Company, France) are added and the solution is placed in an oven at 80° C. for 24 h. After cooling at ambient temperature, the solution is purified on a VIVASPIN® system at 10 kDa.

Seven solutions containing different concentrations of tagged inhibitor DOTA-GA (Tb) are prepared by adding volumes from 0 to 1000 μL of a solution of inhibitor at 100 ppm to volumes of water from 1000 to 2000 μL in order to obtain concentrations in inhibitor between 0 and 50 ppm and a total volume of 2 mL. A solution containing 50 ppm of $TbCl_3$ is also prepared for reference.

A solution of 2 mL of water containing 1 ppm of tagged inhibitor DOTA-GA(Tb) is then analysed.

The measurements are taken at ambient temperature on a Cary Eclipse from Agilent (75 kW Xenon flash lamp, Honochromateurs Czerny-Turner, $\Delta_{pulse}$=2 μs, PM detector at 800V). The delay is set to 0.1 ms and the duration of the photon collection to 5 ms. The frequency of the lamp is set to 100 Hz.

Figure 6:
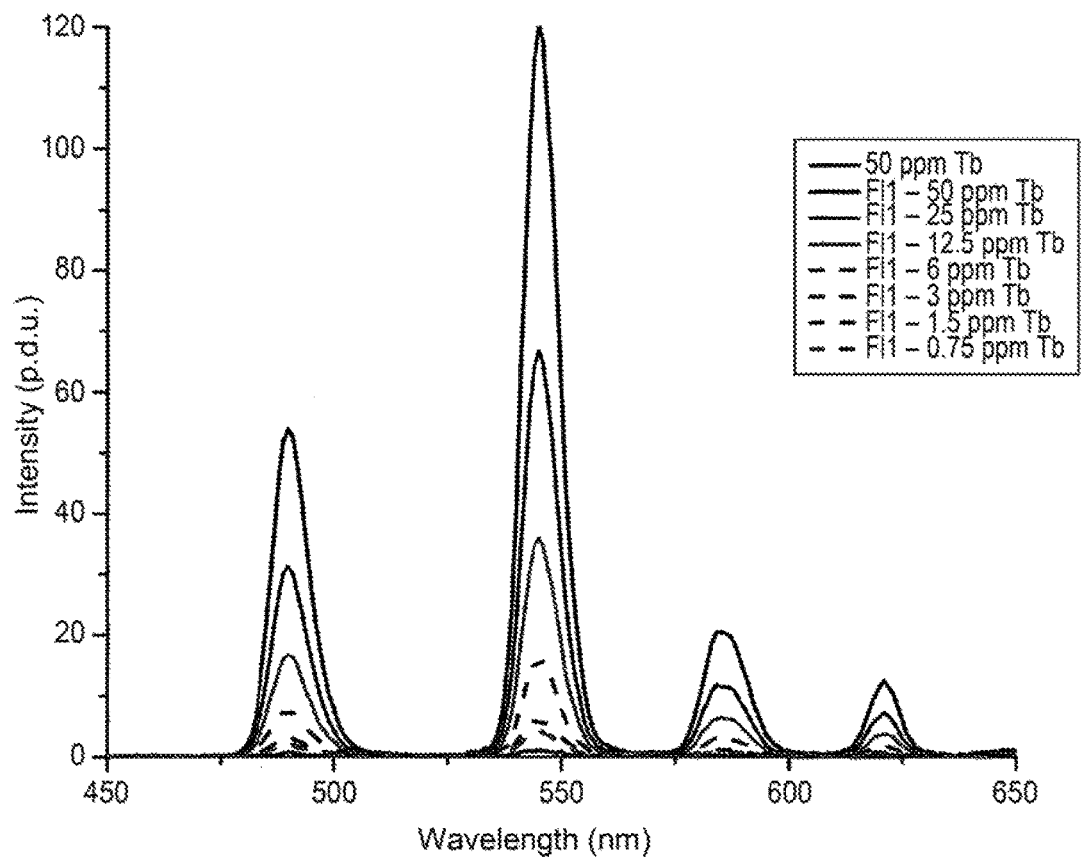
FIG. 6 shows the emission spectra of various concentrations of inhibitor Fl1 tagged DOTA-GA(Tb)

A set of emission spectra is carried out between 450 and 650 nm with $\lambda_{exc}$=352 nm. The curves obtained are shown in FIG. 6. This Figure clearly shows the characteristic emission peaks of terbium at 485, 545, 575 and 620 nm. In addition, an increase in the intensity according to the quantity of tagged inhibitor present in solution is clearly observed. This makes it possible to confirm that it is possible to detect this tagged inhibitor at a concentration less than 0.75 ppm with good accuracy.

Example 8

Detection of Polyethyleneimine Tagged by Grafting-Complexation

In a 100 mL bottle, 4.6 mL of polyethyleneimine (inhibitor of zinc and lead sulphide deposits) at 10% by weight is placed. 29.3 mg of DOTA-GA anhydride (Chematech Company, France) are added as well as a sufficient quantity of distilled water in order to reach a total volume of 60 mL. The solution is stirred by magnetic stirring for 2 h. 30.0 mg of $EuCl_3.6H_2O$ (Nano-H Company, France) are then added to the prepared solution. The whole is placed in an oven at 80° C. for about 12 h. After cooling at ambient temperature, the solution is purified on a VIVASPIN® system at 10 kDa with a rate greater than 1000.

A solution of 2 mL of grafted inhibitor DOTA-GA(Eu) at 1 ppm is prepared.

The measurements are taken at ambient temperature on a Cary Eclipse from Agilent (75 kW Xenon flash lamp, Czerny-Turner Monochromators, $\Delta_{pulse}$=2 μs, PM detector at 800V). The delay is set to 0.1 ms and the duration of the photon collection to 5 ms. The frequency of the lamp is set to 100 Hz.

An emission spectrum of the prepared solution is carried out between 550 and 750 nm with $\lambda_{exc}$=595 nm. The curve obtained is shown in FIG. 7.

This Figure clearly shows the characteristic peaks of europium at 595, 615 and 700 nm. This test shows that it is possible to tag inhibitors such as polyethyleneimine with a complex such as DOTA-GA(Eu) and to detect them at concentrations less than 1 ppm.

Example 9

Study of the Variation of the Integration Delay

Fifteen solutions of variable concentrations between 0 and 10 ppm are prepared by adding volumes from 0 to 1000 nl of solution of sulphonated PPCA at 100 ppm in 2 mL of water. A sufficient quantity of $TbCl_3$ is then added in order to obtain a concentration equal to 10 ppm. The solutions are mixed and the measurements taken after 5 minutes.

The measurements are taken in a quartz cuvette at ambient temperature on a Cary Eclipse from Agilent (75 kW Xenon flash lamp, Czerny-Turner Monochromators, $\Delta_{pulse}$=2 μs, PM detector at 800V). The collection duration of the photons is set to 5 ms. The frequency of the lamp is set to 100 Hz.

Excitation spectra of the various samples are carried out between 220 and 250 nm with $\lambda_{en}$=545 nm with a delay of 0.1 ms or 3 ms. The spectra obtained are shown in FIGS. 8 and 9, respectively. By comparing FIGS. 8 and 9, it can be noted that the increase of the delay from 0.1 ms to 3 ms makes it possible to very substantially reduce the background noise (passage from an intensity of 200 p.d.u. to about 0), which has for effect to very substantially increase the signal-to-noise ratio and therefore allows for a much easier detection of the various inhibitors analysed. As can also be noted, a longer delay makes it possible to also obtain better linearity all throughout the analysis.

The invention claimed is:

1. A method for adjusting to a predetermined value an amount of a mineral deposition inhibitor and a corrosion inhibitor injected into a gas or oil well, comprising the following successive steps:
    tagging the mineral deposition inhibitor and the corrosion inhibitor with a lanthanide, said tagging being carried out by (i) grafting, on the skeleton of each of the mineral deposition inhibitor and the corrosion inhibitor, a molecule complexing the lanthanide, or (ii) via complexation of the lanthanide with the mineral deposition inhibitor and the corrosion inhibitor;
    extracting a fluid from a production well;
    detecting and quantifying the tagged mineral deposition inhibitor and the tagged corrosion inhibitor, via time-resolved fluorescence, in the fluid extracted from the production well; and
    if the amount of the tagged mineral deposition inhibitor or the tagged corrosion inhibitor does not meet the predetermined value, injecting into the well an additional quantity of the inhibitor to reach said predetermined value,
    wherein the mineral deposition inhibitor is selected from the group consisting of polyphosphates, organophosphonates, carboxylic polyacides, polymers with a sulphonic acid function, polyphosphinocarboxylic acid (PPCA), sulphonated polyphosphinocarboxylic acid (PPCA), polyethyleneimine, silicone polymers functionalised by amine groups, and copolymers made from quaternary ammonium, and
    wherein the corrosion inhibitor is selected from the group consisting of cyclohexylamine, hexylamine, morpholine, octadecylamine, diethylaminoethanol and betaines.

2. The method according to claim 1, wherein the lanthanide is selected from the group consisting of: Pr, Nd, Sm, Eu, Tb, Dy, Ho, Er, Tm and Yb, mixtures thereof, and alloys thereof.

3. The method according to claim 1, wherein the tagging of the mineral deposition inhibitor and the corrosion inhibitor is carried out by grafting, on the skeleton of the mineral deposition inhibitor and the corrosion inhibitor, a molecule complexing the lanthanide.

4. The method according to claim 1, wherein the tagging of the mineral deposition inhibitor and the corrosion inhibitor is carried out via complexation of the lanthanide with the mineral deposition inhibitor and the corrosion inhibitor.

5. The method according to claim 1, wherein an integration delay between the excitation of the sample to be analyzed and the measuring of the signal emitted is between 0.001 and 10 ms.

6. The method according to claim 1, wherein the mineral deposition inhibitor is selected from the group consisting of styrene sulphonic acid and maleic acid copolymers.

* * * * *